Dec. 15, 1931.    H. C. WARNER    1,836,210

GEAR CUTTING MACHINE

Filed Aug. 15, 1930

Homer C. Warner INVENTOR
BY Harvey R. Hawgood
ATTORNEY

Patented Dec. 15, 1931

1,836,210

UNITED STATES PATENT OFFICE

HOMER C. WARNER, OF CLEVELAND, OHIO, ASSIGNOR TO THE LEES-BRADNER COMPANY, OF CLEVELAND, OHIO, A CORPORATION OF OHIO

GEAR CUTTING MACHINE

Application filed August 15, 1930. Serial No. 475,577.

This invention relates to a machine for hobbing gears and the like, and more particularly to a machine by which helical teeth, threads, and other curved and inclined surfaces may be formed.

An object of the invention is to provide an improved machine which will accurately produce helical gear teeth and the like.

Another object is to provide an improved machine which will automatically compensate for any desired helix angle about which the teeth of a gear are to be formed.

Another object is to provide an improved machine which will be efficient in operation and simple in construction.

Another object is to provide an improved machine in which relatively few accurate parts are required.

Other objects will hereinafter appear.

Figure 1:
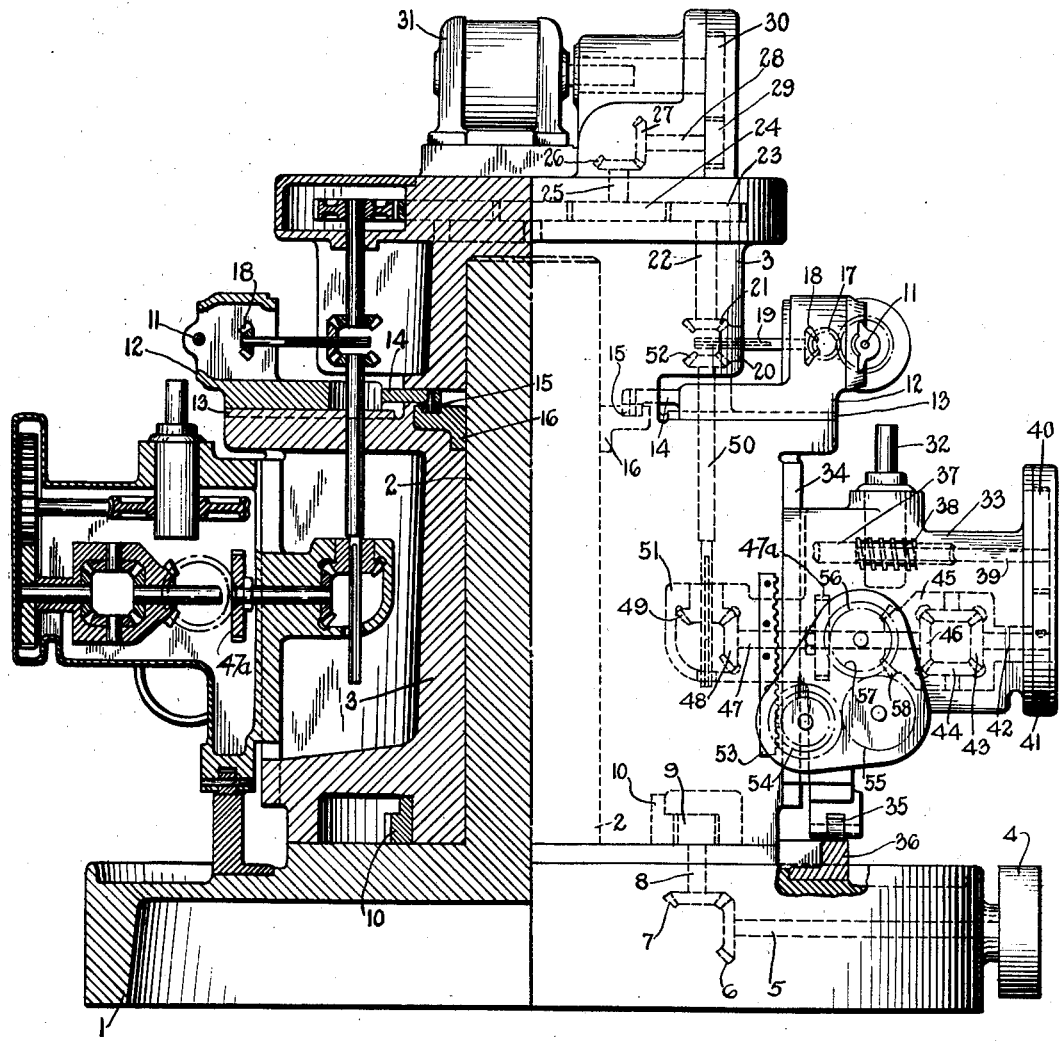
Figure 1:
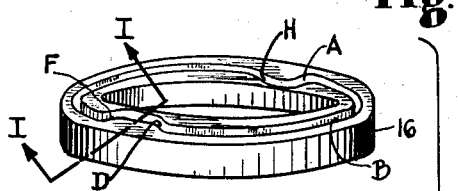
Figure 2:
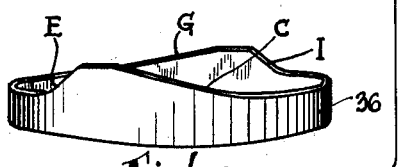

The invention will be better understood from the description of one practical embodiment thereof illustrated in the accompanying drawings, in which;

Figure 1 is a side elevation of a machine embodying the invention, the left hand half being shown in section, taken on the line I—I of Figure 2; and Figure 2 is a perspective view of the two cam devices which actuate the mechanism of Figure 1.

The machine shown comprises a base 1 provided with a centrally disposed upwardly extending pedestal 2 upon which is pivoted a main frame 3 by which the bulk of the mechanism is supported. A pulley 4, driven from any suitable source of power, drives a horizontal shaft 5 journalled in the base and and provided on its inner end with a bevelled gear 6 meshing with a bevelled gear 7, upon a vertical shaft 8, also journalled in the base. The upper end of this shaft 8 is provided with a pinion 9, which meshes with a ring gear 10 rigidly attached to the frame 3, and by this means rotates the frame about the pedestal.

A plurality of similar hobbing mechanism are mounted on the frame and travel with it about the pedestal, the arrangement being similar in general to that shown in the patent to Charles H. Schurr, Number 1,621,223, issued March 15, 1927.

Each hobbing mechanism consists of a tool spindle 11 mounted in horizontal bearings carried by a carriage 12, slidable radially of the frame, on horizontal ways 13. Each tool carriage is provided with an inwardly extending arm 14 provided on its inner end with a roller 15 which runs in a cam-shaped groove in a sleeve 16 rigidly attached to the pedestal, the shape of the cams being better shown in Figure 2.

The tool spindle is rotated by means of gears 17 driven by a bevelled gear 18 carried upon a radial shaft 19 which is splined to a bevelled gear 20 carried within the frame, and driven by a bevelled gear 21 on the lower end of a vertical shaft 22 journalled in the frame.

The shaft 22 is driven at its upper end by gears 23 and 24, the latter of which is keyed to a vertical shaft 25 having at its upper end a bevelled gear 26 meshing with a bevelled gear 27 upon a horizontal shaft 28 provided at its upper end with a gear 29 and driven by a gear 30 operated by the shaft of an electric motor 31. The motor 31 is mounted upon the top of the frame, and gears 24 to 30 may be connected to each hobbing unit, the power being transmitted to the several gears 24 through idlers in the upper part of the frame.

A vertical work spindle 32 is supported by a carriage 33 slidable upon vertical ways 34 on the side of the frame. The work carriage is provided at its lower end with a roller 35 running upon a circular cam-shaped track 36 and so raises and lowers the carriage as the frame travels around the pedestal. The work spindle is provided, within the carriage, with a worm wheel 37 driven by a worm 38 keyed to a shaft 39. This shaft is provided on its outer end with a gear 40, driven by a gear 41 upon a horizontal shaft 42. The inner end of shaft 42 is provided with a bevelled gear 43 constituting part of a differential mechanism enclosed within the carriage. The idler gears 44 of the differential mechanism are carried in cage 45 to be hereinafter described, and the bevelled gear 46 is in mesh with the idlers, being keyed to the outer end of a radial shaft 47, the inner end of which is provided with a bevelled gear 48 in mesh with a bevelled gear 49 splined to the vertical shaft 50.

The shaft 47 is made in two parts, connected by gears 47a, so that the outer of these parts will be offset and not obstruct the space beneath the work spindle. The gears 48 and 49 are carried in an extension 51 of the work carriage, while the shaft 50 is journalled in the frame and provided at its upper end with a bevelled gear 52 meshing with the bevelled gear 20 above described.

It will thus be seen that if the cage of the differential be maintained stationary when the motor 31 is operated, this will rotate the cutter spindle, and will also rotate the work spindle 32 at a predetermined relative speed thereto, and that this speed may be adjusted by proper selection of the gears 40 and 41.

Mounted upon the frame adjacent the work carriage is a vertical rack 53, and meshing with this rack is a pinion 54 carried by the work carriage. This pinion drives an idler 55 and a gear 56 to which is keyed a bevelled gear 57, meshing with a bevelled gear 58 formed upon the cage of the differential mechanism. Therefore, if the work carriage be moved vertically, the vertical motion will impart a rotation to the differential cage and hence to the work spindle, independent of any power received from motor 31, and the amount of this independent rotation may be adjusted by proper selection of gears 54, 55 and 56.

The cams 16 and 36 are so selected that the former will feed the tool or cutter to and from the work, while the latter feeds the work carriage upwardly to allow the cutter to traverse the same, and it is obvious that by forming the cams as shown, two cuts may be provided, conveniently a roughing cut and a finishing cut. Of course, the cams can provide for only a single cut if desired.

In operation, the roller 15 is moved outwardly by part A of cam 16 and maintained in its fed position by part B in this cam. While the cutter is being held in this position, the work gear or blank is fed upwardly past it by roller 35 traversing the upward slope C of cam 36. When the roughing cut has been finished, portion D of cam 16 retracts the cutter, and at the same time roller 35 passes onto the downward slope E permitting the work carriage to drop back to its lowermost position. The cutter is then fed in by the motion of its roller along portion F of cam 16 for the finishing cut, and the work carriage again fed upwardly by roller 35 traversing upwardly inclined portion G of cam 36. At the end of the finishing cut, the tool is retracted by portion H of its cam and roller 35 descends incline I of cam 36 to return the parts to their original position.

While I have described the illustrated embodiment of my invention in some particularity, this is done by way of illustration only, it being obvious that many other embodiments will readily occur to those skilled in this art, and I do not, therefore, limit myself to the precise details shown and described, but claim as my invention all embodiments, variations and modifications coming within the scope of the subjoined claims.

I claim:

1. A hobbing machine comprising a tool spindle and a work spindle, means for moving one of said spindles laterally, means for moving the other spindle axially, gearing connecting said spindles to cause them to rotate in a predetermined relation, and independent gearing rotating one of said spindles relative to the other actuated by its axial movement.

2. A hobbing machine comprising a vertical spindle, a vertically movable slide for said vertical spindle, a horizontal spindle, a horizontally movable slide for said horizontal spindle, a support for said slides, a gear train connecting said spindles, and gearing in said train rotated by the vertical movement of said vertical spindle.

3. A hobbing machine comprising a frame, a horizontally movable slide mounted thereon, a horizontal spindle carried by said slide, a vertically movable slide carried by said frame and having a vertical spindle thereon, a gear train connecting said spindles and including a differential mechanism, and an element carried by the frame and a coacting element carried by the slide one of said elements being connected to part of said differential mechanism.

4. A hobbing machine comprising a base, a frame rotatably carried thereby, a horizontally movable slide carried by said frame, a cam carried by said base actuating said slide, a vertically movable slide carried by said frame, a second cam carried by said base for actuating said last mentioned slide, spindles carried by both said slides, a gear train connected to said spindles comprising gearing rotating said spindles at relatively fixed speeds and actuated by the vertical movement of the second mentioned slide to rotate one of said spindles relative the other.

5. A hobbing machine comprising a base, a frame rotatably carried thereby, a horizontally movable slide carried by said frame, a cam carried by said base actuating said slide, a vertically movable slide carried by said frame, a second cam carried by said base for actuating said last mentioned slide, spindles carried by both said slides, a gear train connected to said spindles, differential mechanism in said gear train and having a pinion carried by said second mentioned slide, and a rack fixed to said frame engaged by said pinion.

6. In a hobbing machine, a main support, hobbing mechanism carried thereby and movable thereupon in a closed path, said hobbing mechanism comprising a hob spindle and a work spindle and means for rotating the hob and work spindles at a predetermined relative velocity, and independent means for varying the relative velocity by movement of one of said spindles.

7. In a hobbing machine, the combination of a main support, a hobbing mechanism, means for moving the hobbing mechanism upon the support in a closed path, said hobbing mechanism comprising a hob spindle and a work spindle, means for causing a relative hob feeding movement between the spindles, means for causing a translation of the work axially past the hob, means for rotating the work and hob spindles at a predetermined relative velocity, and independent means for varying said relative velocity actuated by the axial movement of the work spindle.

8. A hobbing machine comprising a base having a central pivot, a frame movable thereabout and carrying a hobbing mechanism comprising a hob spindle and a work spindle, means for rotating the frame about said pivot, independent means for rotating said spindles, positive gearing between said spindles causing them to rotate at a predetermined relative velocity, and means in said gearing varying said velocity operated by the movement of one of said spindles relative to the other.

9. A hobbing machine comprising a frame, a work spindle and a tool spindle carried thereby, one of said spindles being bodily movable relative the other, gearing between said spindles causing them to rotate at predetermined relative speeds, driving means rotating said spindles, means moving one of said spindles bodily relative the other, and means actuated by said bodily movement varying the relative rotational speeds of the spindles.

10. A hobbing machine comprising a frame, a guideway thereon, a carrier slidable upon said guideway, a spindle journalled in said carrier, a second spindle carried by said frame, gearing between said spindles, driving means rotating said spindles, feed means moving said carrier along said guideway, and means rotating part of said gearing and actuated by the motion of said carrier.

11. A hobbing machine comprising a frame, a guideway thereon, a carrier slidable upon said guideway, a spindle journalled in said carrier, a second spindle carried by said frame, gearing between said spindles including a differential, means moving said carrier along said guideway, means between said carrier and frame rotating a part of said differential actuated by movement of said carrier.

12. A hobbing machine comprising a frame, a guideway thereon, a carrier slidable upon said guideway, a spindle journalled in said carrier, a second spindle carried by said frame, gearing between said spindle including a differential, driving means connected with one of said spindles and through said gearing with the other, two cooperating elements one carried by the carrier and the other by the frame so as to be actuated by movement of the carrier, and a connection between one of said elements and said differential.

13. A hobbing machine comprising a frame, a guideway thereon, a carrier slidable upon said guideway, a spindle journalled in said carrier, a second spindle carried by said frame, gearing between said spindles including a differential, driving means rotating one of said spindles and through said gearing the other, a stationary element and a movable element one carried by the frame and the other by the carrier, means connecting the movable element to a portion of the differential.

14. A hobbing machine comprising a frame, a guideway thereon, a carrier slidable upon said guideway, a spindle journalled in said carrier, a second spindle carried by said frame, gearing between said spindles including a differential, driving means rotating one of said spindles and through said gearing the other, a rack and a pinion carried by the frame and carrier whereby relative motion of the two latter will cause the pinion to rotate, and gearing between said pinion and a part of the said differential.

15. A hobbing machine comprising a frame, a guideway thereon, a carrier slidable upon said guideway, a spindle journalled in said carrier, a second spindle journalled on said frame, gearing between said spindles including a differential, driving means connected to one of said spindles and through said gearing to the other spindle, a second, driving means independent of said first mentioned driving means for moving said carrier along said guideway, and means rotating a part of said differential actuated by the motion of said carrier.

16. A hobbing machine comprising a frame, two angularly disposed guideways thereon, carriers slidable upon said guide ways, a spindle journalled in each of said carriers, gearing between said spindles including a differential mechanism, driving means connected to one spindle and through said gearing rotating the other, means moving said carriers along said guideways, and means actuated by the motion of one of said carriers to rotate a part of said differential mechanism.

17. A hobbing machine comprising a frame, two angularly disposed guideways thereon, carriers slidable upon said guideways, a spindle journalled in each of the said carriers, gearing between said spindles including a differential mechanism, driving means connected to one spindle and through said gearing rotating the other, feed means moving said carriers along said guideways, a stationary element and a movable element one carried by the frame and the other by one of said carriers, and a connection between said movable elemnet and one portion of said differential mechanism.

18. A hobbing machine comprising a frame, two angularly disposed guideways thereon, carriers slidable upon said guideways, a spindle journalled in each of said carriers, gearing between said spindles including a differential mechanism, driving means connected to one of said spindles and through said gearing rotating the other, means moving said carriers along said guideways, a rack rigidly attached to said frame, a pinion journalled in one of said carriers and in mesh with said rack, and gearing between said pinion and a part of said differential mechanism.

19. A hobbing machine comprising a base, a frame rotatable thereon, a hobbing mechanism, carried by said frame and comprising a work spindle and tool spindle, one of said spindles being bodily movable relative the other, gearing between said spindles including a differential, feed means for moving one of said spindles bodily relative the other, means actuated by said bodily movement moving a part of said differential, driving means moving the frame upon the base, and a separate driving means connected to one of said spindles and through said gearing driving the other.

20. A hobbing machine comprising a base, a frame rotatable thereon, a hobbing mechanism carried by the frame and comprising a work spindle and a tool spindle, one of said spindles being bodily movable relative the other, gearing between said spindles including a differential, driving means connected to one of said spindles and through said gearing rotating the other, a second driving means causing the frame to rotate upon the base, feed means moving one of said spindles bodily relative the other and actuated by the rotation of the frame, and gearing actuated by the bodily movement of said spindle and connected to a part of said differential.

In testimony whereof, I hereunto affix my signature this 11 day of August, 1930.

HOMER C. WARNER.